(12) United States Patent
Horita et al.

(10) Patent No.: US 11,207,597 B2
(45) Date of Patent: Dec. 28, 2021

(54) GAME SYSTEM, COMPUTER-READABLE NON-TRANSITORY STORAGE MEDIUM HAVING GAME PROGRAM STORED THEREIN, GAME APPARATUS, AND GAME PROCESSING CONTROL METHOD

(71) Applicant: NINTENDO CO., LTD., Kyoto (JP)

(72) Inventors: Junpei Horita, Kyoto (JP); Kazuyoshi Sensui, Kyoto (JP); Masaki Yasuhara, Kyoto (JP)

(73) Assignee: NINTENDO CO., LTD., Kyoto (JP)

( * ) Notice: Subject to any disclaimer, the term of this patent is extended or adjusted under 35 U.S.C. 154(b) by 0 days.

(21) Appl. No.: 17/070,109

(22) Filed: Oct. 14, 2020

(65) Prior Publication Data
US 2021/0146251 A1 May 20, 2021

(30) Foreign Application Priority Data
Nov. 19, 2019 (JP) .............................. JP2019-208774

(51) Int. Cl.
  *A63F 13/55* (2014.01)
  *A63F 13/45* (2014.01)
(52) U.S. Cl.
  CPC .............. *A63F 13/55* (2014.09); *A63F 13/45* (2014.09); *A63F 2300/55* (2013.01); *A63F 2300/63* (2013.01)

(58) Field of Classification Search
  CPC ...... A63F 13/45; A63F 13/55; A63F 2300/55; A63F 2300/63
  See application file for complete search history.

(56) References Cited

U.S. PATENT DOCUMENTS

| | | | |
|---|---|---|---|
| 2013/0130780 A1* | 5/2013 | Allen ................. | G07F 17/3272 463/25 |
| 2016/0346677 A1* | 12/2016 | Kim ...................... | A63F 13/45 |
| 2020/0078683 A1* | 3/2020 | Anabuki ............... | G06T 13/20 |
| 2020/0122021 A1* | 4/2020 | Gordon ............... | A63F 13/5378 |

OTHER PUBLICATIONS

Nintendo Co., Ltd., "Animal Crossing: Pocket Camp [Making Furniture]", [online], [searched on Nov. 8, 2019], Internet (URL: https://ac-pocketcamp.com/ja-JP/site/guide#aboutItem), with English Translation, 26 pages.

* cited by examiner

*Primary Examiner* — Steven J Hylinski
(74) *Attorney, Agent, or Firm* — Nixon & Vanderhye P.C.

(57) ABSTRACT

A use start time of a game application is stored in advance. When a predetermined event is executed, a waiting time is determined on the basis of the use start time and a reference waiting time associated with the predetermined event, such that the waiting time is made shorter when the start time is earlier. Then, a reward related to the event is given to a user after elapse of the waiting time.

18 Claims, 15 Drawing Sheets

| WORKBENCH NUMBER (331) | WORK STATE (332) | PRODUCTION FURNITURE ID (333) | PRODUCTION START DATE AND TIME (334) | PRODUCTION TIME (335) |
|---|---|---|---|---|
| 1 | MIDDLE OF PRODUCTION | 0010 | yy/mm/dd hh:mm:ss | 120 |
| 2 | COMPLETED | 0020 | yy/mm/dd hh:mm:ss | 600 |
| 3 | FREE | NONE | NONE | NONE |
| 4 | FREE | NONE | NONE | NONE |

| FURNITURE ID (341) | REFERENCE PRODUCTION TIME (342) | APPEARANCE DATA (343) |
|---|---|---|
| 0001 | 120 MINUTES | ... |
| 0002 | 250 MINUTES | ... |
| 0003 | 400 MINUTES | ... |
| 0004 | 300 MINUTES | ... |
| ⋮ | ⋮ | ⋮ |

Fig. 14

| NUMBER-OF-DAYS-ELAPSED INFORMATION | SHORTENING TIME INFORMATION |
|---|---|
| 0 DAYS | 120 MINUTES |
| 10 DAYS | 140 MINUTES |
| 20 DAYS | 160 MINUTES |
| ⋮ | ⋮ |
| 4460 DAYS | 9040 MINUTES |

Fig. 15

| CLIENT-SIDE PROGRAM |
|---|
| OPERATION DATA |
| OBJECT DATA |
| TERMINAL-SIDE SAVED DATA |
| ⋮ |

GAME SYSTEM, COMPUTER-READABLE NON-TRANSITORY STORAGE MEDIUM HAVING GAME PROGRAM STORED THEREIN, GAME APPARATUS, AND GAME PROCESSING CONTROL METHOD

CROSS REFERENCE TO RELATED APPLICATION

This application claims priority to Japanese Patent Application No. 2019-208774 filed on Nov. 19, 2019, the entire contents of which are incorporated herein by reference.

FIELD

The present invention relates to a game system, etc., which execute a game application including a predetermined event.

BACKGROUND AND SUMMARY

Hitherto, a game application including an event for which a predetermined waiting time is set until completion has been known. For example, there is a game application including a production event in which a furniture item can be produced by a user character requesting a non-player character to produce the furniture item. When a production time that is set for each furniture item has elapsed, the furniture item is completed, and the user can acquire the furniture item.

In the above game, after an event starts, until a predetermined time that is set so as to be associated with the event elapses, the user needs to wait. In this regard, there is room for further improvement in terms of further increasing the convenience of the user.

Therefore, it is an object of the exemplary embodiments to provide a game system, etc., which can further improve the convenience of a user in a game including an event that requires a waiting time of the user.

In order to attain the object described above, for example, the following configuration examples are exemplified.

A configuration example is directed to a game system including at least one processor and executing a game application including a predetermined event. The at least one processor singly or in cooperation executes: storing start time information indicating a time related to start of use of the game application by a user who uses the game application, such that the start time information is associated with the user; executing the predetermined event; determining a waiting time on the basis of the start time information and a reference waiting time associated with the predetermined event; and giving a reward related to the predetermined event, to the user after the waiting time elapses from start of the predetermined event. In the determination, the waiting time is determined such that the waiting time is made shorter when the time indicated by the start time information is earlier.

According to the above configuration example, the waiting time in the predetermined event can be varied in accordance with the game start time. In addition, when a game start time of a certain game is earlier, the waiting time can be made shorter. Accordingly, the convenience of a user who has an early game start time can be enhanced.

In another configuration example, the waiting time may be determined such that the waiting time is made shorter when a period from the time indicated by the start time information to the start of the predetermined event is longer.

According to the above configuration example, the convenience of a user who has an early game start time can be enhanced.

In another configuration example, the game system may further switch a game mode from a first mode to a second mode on a condition that the user pays predetermined compensation. In the determination, the reference waiting time may be determined as the waiting time when the game mode is the first mode, and the waiting time may be determined on the basis of the reference waiting time and the start time information when the game mode is the second mode.

According to the above configuration example, the first mode and the second mode can be selectively used in accordance with the situation of the user, so that the convenience of the user can be enhanced.

In still another configuration example, the waiting time may be determined by subtracting a shortening value, which is a value determined in accordance with the start time information, from the reference waiting time.

According to the above configuration example, it can be made easier for the user to realize the effect of reducing the waiting time.

In still another configuration example, when the game mode is the first mode, the game system may further present at least either the shortening time for a case where the game mode is switched to the second mode or the waiting time shortened by the shortening time, to the user.

According to the above configuration example, the presence of the second mode and an effect achieved when the second mode is used can be clearly presented to the user.

In still another configuration example, when the game mode is the second mode, the waiting time may be determined by subtracting the shortening time, which is a value larger than 0, from at least the reference waiting time, regardless of a length of a period from the use start time of the game application indicated by the start time information to the start of the predetermined event.

According to the above configuration example, even when a user who has just started using the game uses the second mode, the user can receive an effect of reducing the waiting time to some extent.

In still another configuration example, the game system may further present information about the predetermined event to the user. In the presentation of the information, when the game mode is the second mode, the waiting time is presented to the user in a manner in which it is possible to recognize how much the waiting time is reduced from the reference waiting time.

According to the above configuration example, the effect achieved when the second mode is used can be presented to the user such that the effect is easily realized.

In still another configuration example, when the game mode is the second mode and the predetermined event is in progress, an image indicating the waiting time is a time shorter than the reference waiting time may be presented.

According to the above configuration example, the fact that the second mode is used, and the effect thereof can be presented to the user in a manner in which it is easy to realize the fact and the effect.

In still another configuration example, the second mode may be a mode to which the game mode is switched on a condition that a right validated by the user paying compensation remains. In the determination, the waiting time may be determined on the basis of the reference waiting time and the start time information even when the right becomes validated by the user paying compensation again and the game mode is switched to the second mode after the right is invalidated once.

According to the above configuration example, regardless of the timing when the second mode is used, determination of the waiting time based on the reference waiting time and the start time information can be always applied during use of the second mode.

In still another configuration example, a timing when saved data of the game application is created may be stored as the start time information.

According to the above configuration example, information indicating the time when the user started using the game application can be stored by a simple process.

Another configuration example is directed to a game system including at least one processor and executing a game application including a predetermined event, the at least one processor singly or in cooperation executing: storing start time information indicating a time related to start of use of the game application by a user who uses the game application, such that the start time information is associated with the user; executing an event for which achievement of a predetermined amount of tasks is set as an achievement condition, as the predetermined event; and determining the predetermined amount on the basis of the start time information and a reference required amount that is defined as a value for a reference of the predetermined amount so as to be associated with the predetermined event. In the determination, the predetermined amount is determined such that the predetermined amount is made smaller when the time indicated by the start time information is earlier.

According to the exemplary embodiments, the convenience of the user regarding the waiting time required in the event can be improved.

BRIEF DESCRIPTION OF THE DRAWINGS

FIG. 12 illustrates a non-limiting example of the data structure of production status data 325;

FIG. 13 illustrates a non-limiting example of the data structure of furniture master data 305;

FIG. 14 illustrates a non-limiting example of the data structure of shortening time definition data 306;

FIG. 15 illustrates a non-limiting example of programs and data stored in a memory 113 of the smart device 102;

DETAILED DESCRIPTION OF NON-LIMITING EXAMPLE EMBODIMENTS

Figure 1:
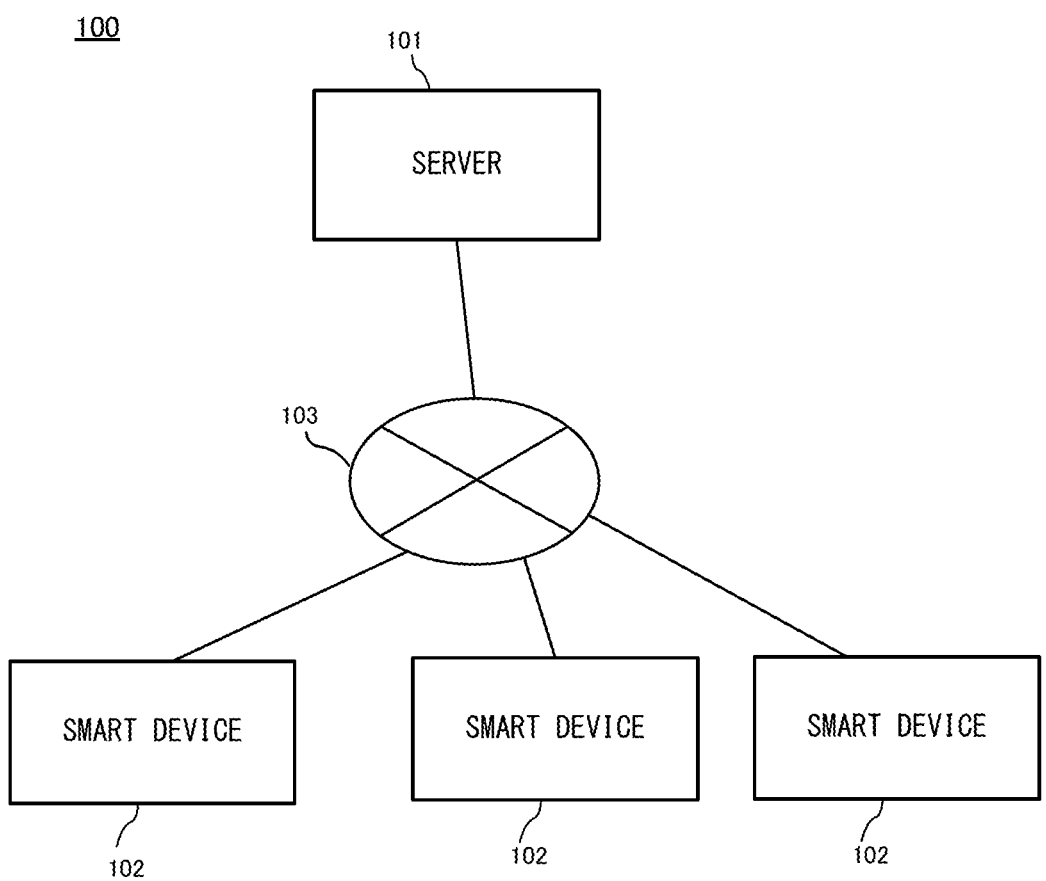
FIG. 1 is a schematic diagram showing a non-limiting example of the entire structure of an information processing system according to an exemplary embodiment.

Hereinafter, one exemplary embodiment will be described. It is to be understood that, as used herein, elements and the like written in the singular form with the word "a" or "an" attached before them do not exclude those in the plural form. FIG. 1 is a schematic diagram showing the entire structure of an information processing system according to the exemplary embodiment. The information processing system 100 according to the exemplary embodiment includes a server 101 and a plurality of terminals 102. In the exemplary embodiment, a smart device is assumed as an example of each terminal 102. In the exemplary embodiment, a hand-held information processing terminal such as a smartphone or a tablet is assumed as an example of each smart device 102, but processing according to the exemplary embodiment can also be applied to the case with a stationary smart device. The server 101 and the smart devices 102 are configured to be able to communicate with each other via the internet 103.

In the exemplary embodiment, information processing is executed with such a configuration, and game processing will be described as an example of the information processing below. Specifically, a game program is installed on a smart device, and game processing is executed while communication is being performed with the server 101 as appropriate. In the game processing according to the exemplary embodiment, data itself indicating a play status of a user is stored in the server 101. The data indicating the play status is, for example, information about a user character to be performed by the user, data indicating a progress status of later-described game tasks, possessed items, etc., and is later-described saved data 308 as an example. For example, at the start of the game, a process of logging in to the server 101 is performed, the saved data 308 indicating a play status of the user is acquired on the smart device 102 from the server 101, and game processing is executed on the basis of the saved data 308.

[Hardware Configuration of Server]

Figure 3:
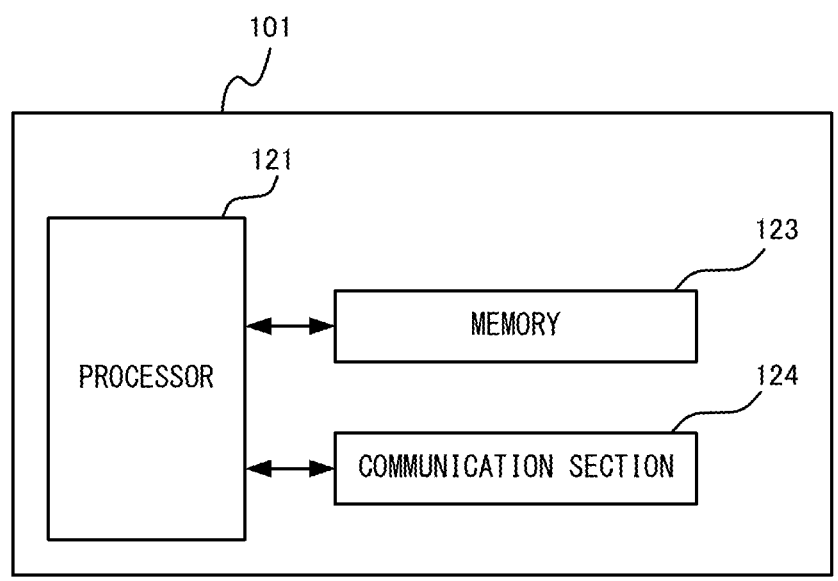
FIG. 3 is a block diagram showing a non-limiting example of the configuration of a server 101.

Next, the hardware configuration of the server 101 will be described. FIG. 3 is a functional block diagram of the server 101. The server 101 includes at least a processor 121, a memory 123, and a communication section 124. The processor 121 executes various programs for controlling the server 101. In the memory 123, various programs to be executed by the processor 121 and various kinds of data to be used by the processor 121 are stored. The communication section 124 connects to a network by means of wired or wireless communication and transmits/receives predetermined data to/from the smart devices 102 or another server (not shown).

[Hardware Configuration of Smart Device]

Figure 2:
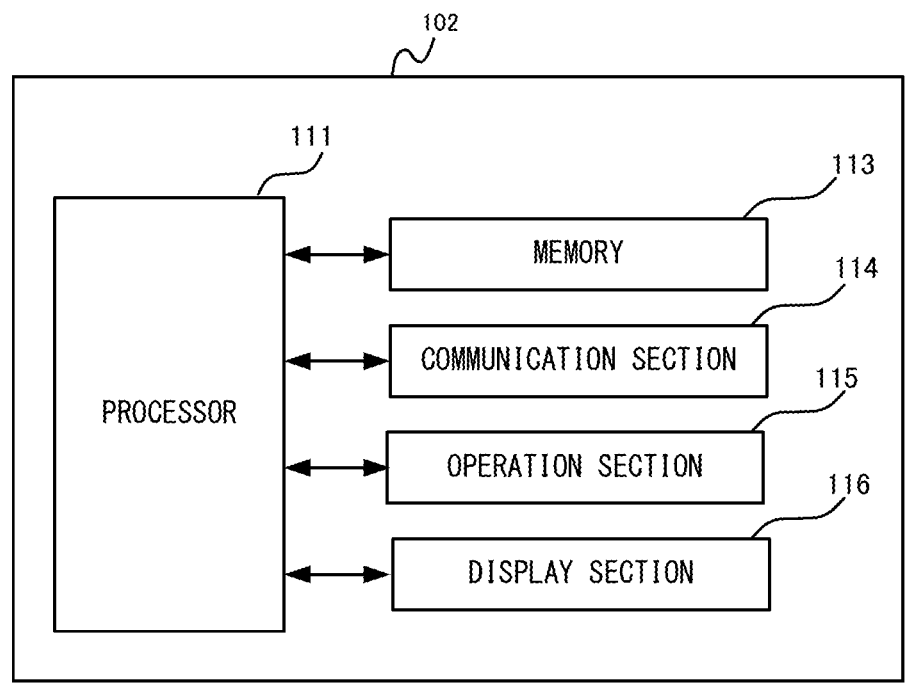
FIG. 2 is a block diagram showing a non-limiting example of the configuration of a smart device 102.

Next, the configuration of each hardware in the above system will be described. FIG. 2 is a functional block diagram of the smart device 102. In FIG. 2, the smart device 102 includes a processor 111, a memory 113, a communication section 114, an operation section 115, and a display section 116. The processor 111 executes later-described information processing or executes a system program (not shown) for controlling overall operation of the smart device 102, thereby controlling operation of the smart device 102. The processor 111 may include a single processor or a plurality of processors. In the memory 113, various programs to be executed by the processor 111 and various kinds of data to be used in the programs are stored. The memory 113 is, for example, a flash EEPROM or a hard disk device. The communication section 114 connects to the network by means of wired or wireless communication and transmits/receives predetermined data to/from the server 101. The operation section 115 is, for example, an input device for receiving an operation from a user. The display section 116 is typically a liquid crystal display device. In the processing according to the exemplary embodiment, a touch panel integrated with a liquid crystal screen is assumed as the operation section 115 and the display section 116. In another exemplary embodiment, a predetermined pointing device other than a touch panel may be used as the operation section 115.

[Outline of Game Processing According to Exemplary Embodiment]

Next, the outline of information processing executed in the exemplary embodiment will be described. In the exemplary embodiment, game processing will be described as an example of the information processing. In particular, the exemplary embodiment relates to a process for shortening a waiting time that is provided in a game, in a predetermined event in which a predetermined reward is given after elapse of the waiting time.

First, the outline of a game assumed in the exemplary embodiment will be described. The game assumed in the exemplary embodiment is a game in which a user virtually lives as a user character in a virtual game world in which various virtual characters live. For example, the user can collect various material items and build their own house, or can maintain their garden. In addition, the user can acquire various items by hunting, fishing, or the like, in the game, or by having a conversation with a virtual character or the like. In particular, in this game, there are "furniture items" that can be arranged in the own house. As an example of the predetermined event, a "furniture production event" that is an event in which the furniture item can be acquired, is prepared. In this game, in addition to furniture items, "clothes" that can be used to dress up the user character, and other items can also be similarly produced. However, for convenience of description, a description will be given on the assumption that production of clothes, etc., is also included in the "furniture production".

The furniture production event will be more specifically described. In this game, an NPC that has the role of producing furniture items (hereinafter, referred to as furniture craftsman NPC) exists in the game world. The user can operate the user character to give an "order" to produce a furniture item, to the furniture craftsman NPC. In addition, in this game, material items required for production are set for each furniture item. Therefore, it is necessary to give such an order to the furniture craftsman NPC after collecting the material items. When a waiting time that is set for each furniture item, that is, a time required to produce the furniture item (hereinafter, furniture production time), has elapsed after the order, the furniture item is completed. The completed furniture item can be received by the user character at a predetermined timing. In other words, the user can acquire the completed furniture item as a reward of the "furniture production event". Such a series of processes from an order to produce a furniture item to completion (or reception) of the furniture item is a furniture production event assumed in this game. In addition, in this case, the furniture item is considered as a "reward" of the event. The furniture item is an example of a reward of the predetermined event, and it is needless to say that, in another exemplary embodiment, in the case of using another event, the reward may be changed to a content other than the furniture item. Moreover, the furniture production time is merely an example of a time (reference waiting time) that is a reference of the waiting time. In another exemplary embodiment, a time other than such a furniture production time may be used as a reference waiting time.

As described above, in this game, a furniture production time is set in advance for each furniture item, and the user is required to wait for completion of the furniture item until this time has elapsed. Here, in this game, when a predetermined condition is satisfied, the furniture production time can be shortened. To determine a time by which the furniture production time is to be shortened, in this example, a shortening time is determined using a time (hereinafter, referred to as a start time) when use of this game is first started, and a final furniture production time is determined.

In this game, the condition for shortening the furniture production time is subscription to a predetermined subscription service. That is, the furniture production time is shortened as a privilege for subscription to the subscription service. In addition, in this example, the subscription service is a monthly fee service. In the following description, a furniture production time (set as a default) before shortening is referred to as a reference production time. Moreover, a furniture production time after shortening (that is, a furniture production time in a state where a privilege of the subscription service has been received) is referred to as post-shortening production time.

Here, a supplemental description will be given for the "start time". In the exemplary embodiment, the time when use of this game is started, in other words, the time point at which this game is first started is used as the start time. Specifically, the date when so-called saved data (data for saving a progress status of the game, etc.) is created is used as the start time. More specifically, the date when saved data that is read when the current game play is started is first created is used as the start time. Therefore, when the saved data is recreated several times after the game is first started, and play is started, the date and time when the saved data is recreated last is used as the start time. Use of such saved data creation date and time is an example, and another time element may be handled as the start time in another exemplary embodiment. For example, the date and time when a game is "started" first after a game application is installed into the smart device may be used as the start time. In addition, the date and time when the game application is installed into the smart device (timing of the completion of installation) may be used as the start time. Alternatively, in the case of a game in which so called "tutorial" is executed after the game is started, the timing when the tutorial ends may be used as the start time. Moreover, in the case of a game in which user registration is required after the game is started, the timing when user registration is completed may be used as the start time.

Next, the outline and a specific example of the method for determining a shortening time in the exemplary embodiment will be described. In this game, a time by which the reference production time is to be shortened is set in advance as a fixed value in accordance with the number of days (calculated on a daily basis) after the saved data is created. This shortening time is set such that, when the furniture production is performed, the shortening time is made longer as the number of days (hereinafter, the number of days elapsed) after the saved data is created is larger. In addition, in this example, an example in which the elapsed period is on a "daily" basis has been described, but, in another exemplary embodiment, the elapsed period is not limited to be on a daily basis, and may be on a weekly basis or on a monthly basis. Furthermore, the elapsed period may be calculated in the form of hours/minutes/seconds.

Hereinafter, a specific example will be described. For example, the case where the reference production time for a certain furniture item is set to 300 minutes is assumed. In addition, three cases where the number of days elapsed from the creation date of the saved data is 10 days, 30 days, and 90 days at the time when an order to produce the furniture item is given, are assumed. In this game, shortening times corresponding to these numbers of days elapsed are set in advance. As an example, it is assumed that the shortening time is set to 140 minutes for the case of 10 days, 180 minutes for the case of 30 days, and 300 minutes for the case of 90 days. Therefore, when the number of days elapsed is 10 days, the post-shortening production time is determined to be 300 minutes−140 minutes=160 minutes. When the number of days elapsed is 30 days, the post-shortening production time is determined to be 300 minutes−180 minutes=120 minutes. When the number of days elapsed is 90 days, the post-shortening production time is determined to be 300 minutes−300 minutes=0 minutes (note that the post-shortening production time cannot be lower than 0 minutes). In this example, the case where the number of days elapsed is 10 days is an example in which the game start time is the latest among the three cases, and the case where the number of days elapsed is 90 days is an example in which the game start time is the earliest among the three cases. As described above, the shortening time is set so as to be increased as the game start time is earlier.

As described above, in this game, a user who starts the game earlier after the release of the game is allowed to make the furniture production time shorter, although subscription to the subscription service is the condition for this. That is, a user who starts the game earlier after the release of the game is allowed to benefit more. Here, a process of giving a predetermined benefit to the user in accordance with the length of (actual) play time of the game is also conceivable. However, in the exemplary embodiment, the length of play time of this game (time during which this game is executed) is not taken into consideration for increasing the shortening time as described above, and the shortening time is increased on the basis of the start time when this game is first started. Accordingly, for example, motivation to return to the game can be provide to a user who started the game early after the release of the game but has not subsequently continuously played the game and has ceased game play. For example, it is considered that a user who started a certain game immediately after the release of the game but soon ceased playing the game will not subsequently play the game. However, in the exemplary embodiment, a greater benefit can be obtained when the game start time is merely early (in other words, regardless of the length of play time itself). Therefore, if such a user desires to return to the game, for example, if such a user becomes interested in the game again due to implementation of a new service related to the game, a possibility that the user will return to the game can be increased, and the number of active users of the game can be expected to be increased.

In the above example, when the number of days elapsed is 90 days, the post-shortening production time is determined to be 0 minutes. That is, in this case, a furniture item is completed simultaneously with ordering (there is no waiting time). Therefore, it is possible to complete furniture items one after another without any waiting time if there are materials, and, also in this respect, it can be said that a greater benefit can be obtained by starting the game (subscribing to the subscription service) earlier.

In this game, even when the number of days elapsed is 0 days, a predetermined time that is greater than 0 is set as a minimum shortening time to be provided to the user. In the case of this game, when the number of days elapsed is 0 days, for example, 120 minutes is defined as the shortening time. Therefore, for example, at the time when a subscription is also taken out to the subscription service at the game start date, the user can already obtain a benefit of a shortening time of 120 minutes. That is, only by subscribing to the subscription service, it is possible to obtain the benefit of shortening the furniture production time to some extent. Accordingly, motivation to subscribe to the subscription service can also be provided.

Hereinafter, a specific example of flow of a game related to the furniture production event will be described using screen examples. First, a screen example in a state where a subscription has not been taken out to the subscription service will be described, and a screen example in a state where a subscription has been taken out to the subscription service will be subsequently described.

Figure 4:
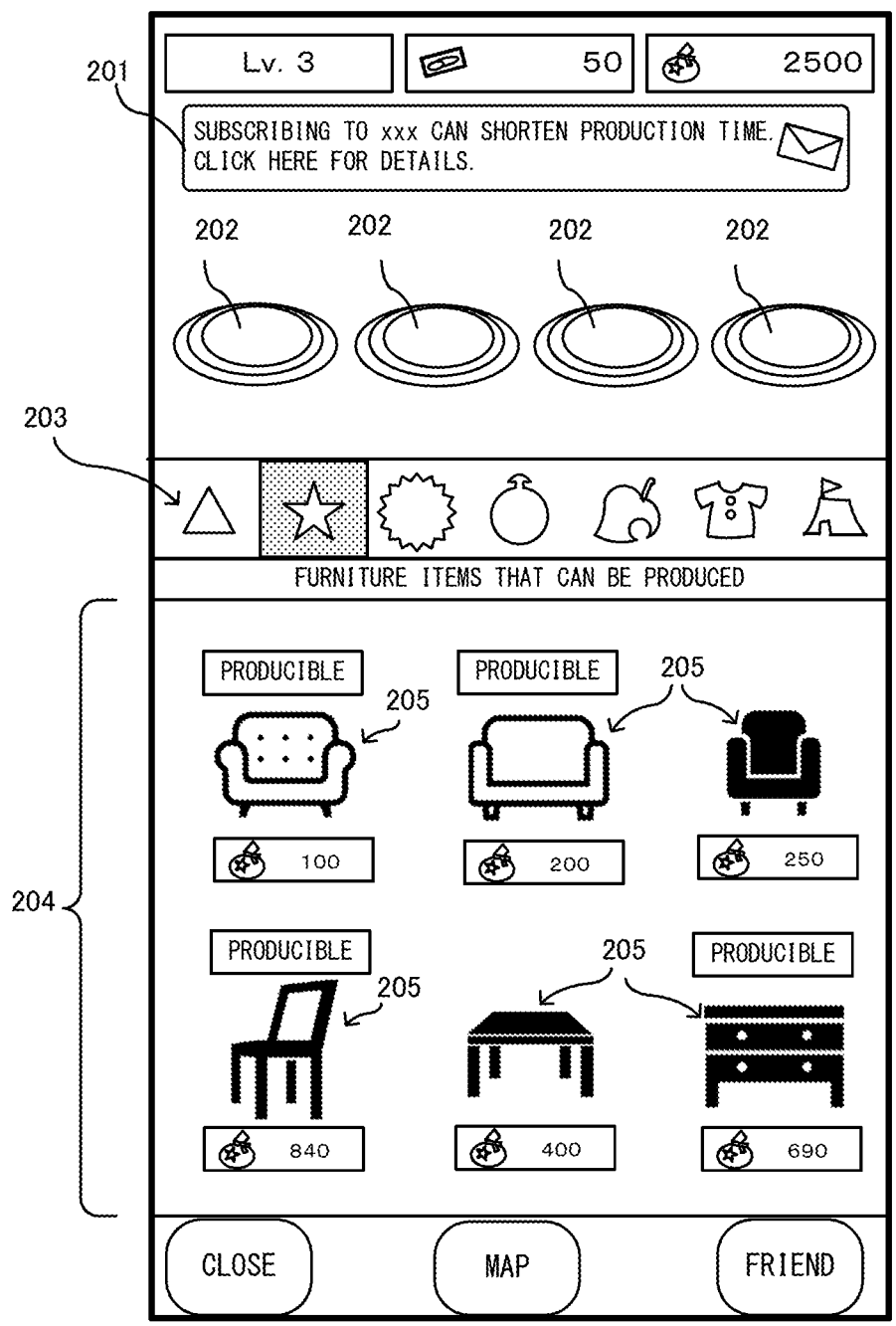
FIG. 4 illustrates a non-limiting screen example of a game in a non-subscription mode of the exemplary embodiment.

First, in this game, an icon of "furniture production" is displayed in a menu. Then, for example, when the user performs a tap operation on the "furniture production" icon, a furniture production menu screen is displayed as shown in FIG. 4. FIG. 4 shows a game image example including a subscription invitation banner 201, four workbenches 202, a genre icon group 203, and a furniture selection area 204. The subscription invitation banner 201 is a banner image showing a message or the like that promotes the user to subscribe to the subscription service. For example, when the user performs a tap operation on the subscription invitation banner 201, a transition can be made to a guide screen for the subscription service. It is also possible for the user to perform an operation for subscribing to the subscription service from the guide screen. Each workbench 202 is an image of a workbench for producing a furniture item. One furniture item can be produced on one workbench, and up to four furniture items can be produced at the same time in the example of FIG. 4. In addition, in this example, when furniture production is ordered, the workbench that is not used is used in order from the left. For the workbench on which a furniture item is being produced, a display (described later) through which it is recognized that the furniture item is being produced is performed. The genre icon group 203 is an icon group for designating the genre of a furniture item to be produced. In this example, furniture items are divided into groups in advance, and each of the groups is shown by an icon image as a genre. The user can perform a tap operation on any one genre in the icon group. The content displayed in the furniture selection area 204 is changed in accordance with this operation. The furniture selection area 204 is an area for designating a specific furniture item to be produced. A plurality of furniture icons 205 are displayed in the furniture selection area 204. A cost (in-game currency required) for production is shown below each furniture icon 205. In addition, when the user character has materials for production, a display indicating "producible" is also shown above each furniture icon 205. In addition, the furniture selection area 204 is a scrollable area. When the user performs a tap operation on any furniture icon that is determined to be producible, an order detail screen for giving an order to produce the furniture item to the furniture craftsman NPC can be displayed. In addition, at a lower part of the furniture production menu screen, a "close" button for ending the menu screen, etc., are also displayed.

Figure 5:
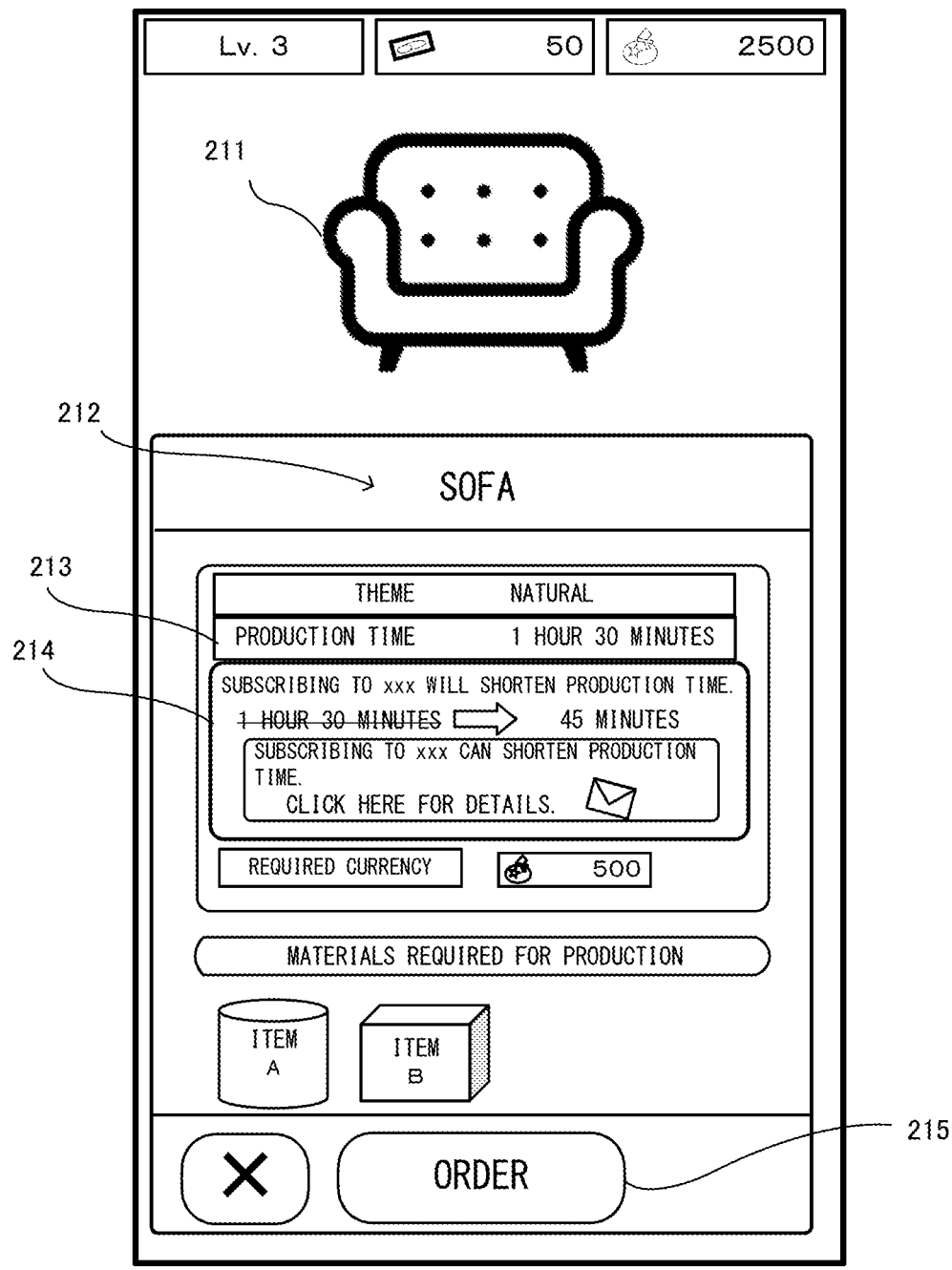
FIG. 5 illustrates a non-limiting screen example of the game in the non-subscription mode of the exemplary embodiment.

FIG. 5 illustrates an example of the order detail screen. In FIG. 5, a furniture image 211 corresponding to the furniture item designated by the user from the furniture selection area 204, and a furniture name 212 indicating the name of the furniture item are shown. Furthermore, production time information 213 and a subscription invitation banner 214 are also included. At the production time information 213, a furniture production time corresponding to the furniture item is shown. Here, due to the state where a subscription has not been taken out to the subscription service, the above-described reference production time is shown as a production time. Similar to the above, the subscription invitation banner 214 is a banner image showing a message or the like that promotes the user to subscribe to the subscription service. Here, in the display on the order detail screen, the subscription invitation banner 214 includes a content that specifically shows how much the production time is shortened if a subscription is taken out to the subscription service. The example of FIG. 5 shows that a furniture production time of 1 hour and 30 minutes is shortened to 45 minutes by subscribing to the subscription service. The shortening time is determined on the basis of the start time when the user started the game, as described above. In this example, the production time after shortening is displayed. However, in another exemplary embodiment, for example, a shortening time itself such as "shortened by 30 minutes" may be displayed. In addition, information indicating the cost for the production and information indicating the material items required for the production are also displayed in the order detail screen. Moreover, at a lower part of the order detail screen, an "x" button for ending the screen and an "order" button 215 for confirming and sending an order are also displayed.

Figure 6:
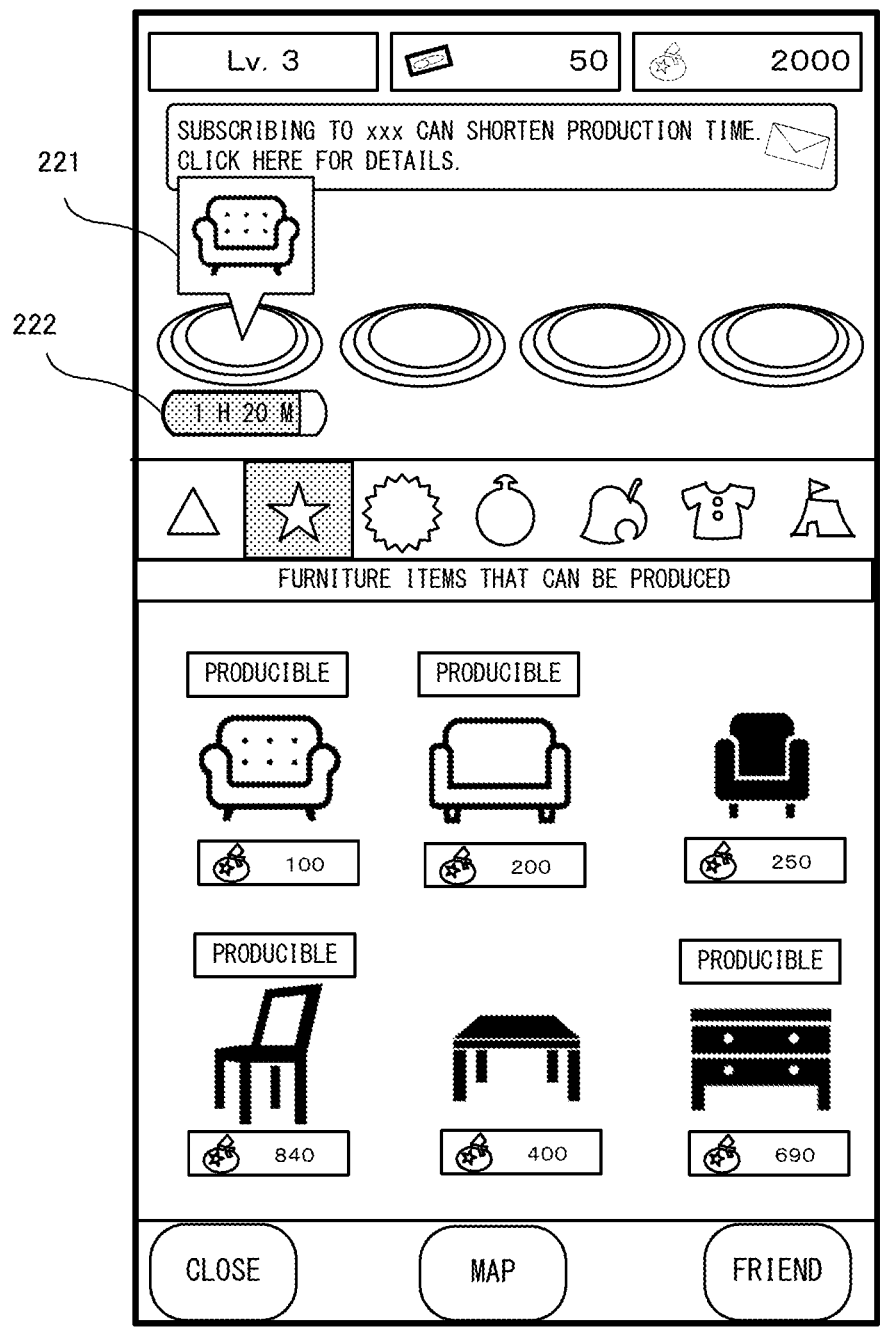
FIG. 6 illustrates a non-limiting screen example of the game in the non-subscription mode of the exemplary embodiment.

When a tap operation is performed on the "order" button 215 in the order detail screen, a furniture production process is started, a return is made to the furniture production menu screen, and a screen is displayed as shown in FIG. 6. FIG. 6 shows that a furniture item is being produced on the leftmost workbench 202. That is, a currently-produced furniture image 221 indicating the furniture item that is being produced is displayed above this workbench 202. In addition, a remaining time meter 222 indicating the remaining time until completion is also displayed below this workbench 202. Accordingly, the user is allowed to recognize the presentence of the furniture item currently being produced and the waiting time until completion. When the furniture item is completed, these displays change to contents showing that the furniture item is completed.

Figure 7:
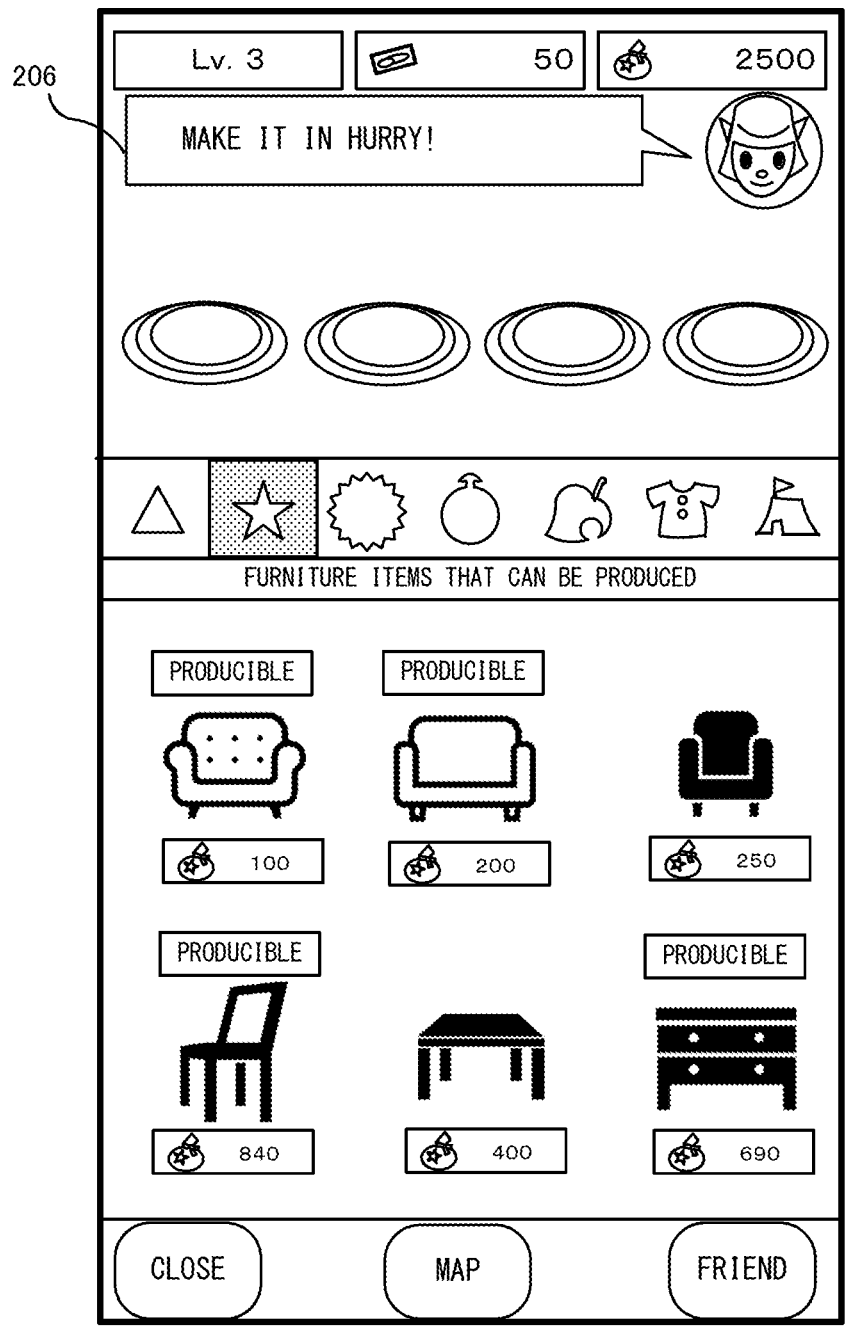
FIG. 7 illustrates a non-limiting screen example of the game in a subscription mode of the exemplary embodiment.

Next, a screen example in a state where a subscription has been taken out to the subscription service will be described. FIG. 7 illustrates an example of the furniture production menu screen in a state where a subscription has been taken out to the subscription service. The furniture production menu screen has the same basic layout as the above-described furniture production menu screen of FIG. 4, but is different in the following points from the furniture production menu screen of FIG. 4. First, the subscription invitation banner 201, which is displayed in a state where a subscription has not been taken out to the subscription service, is not displayed in the furniture production menu screen of FIG. 7. Instead, privilege content information 206 is displayed in the furniture production menu screen of FIG. 7. In the example of FIG. 7, the privilege content information 206 is displayed as a message that a furniture item will be made in a hurry (faster than usual). The privilege content information 206 indicates that it is in a state where a subscription has been taken out to the subscription service, that is, it is in a state where the privilege of shortening the furniture production time has been received. Accordingly, the user is allowed to recognize that it is in a state where the privilege of shortening the furniture production time has been applied.

Figure 8:
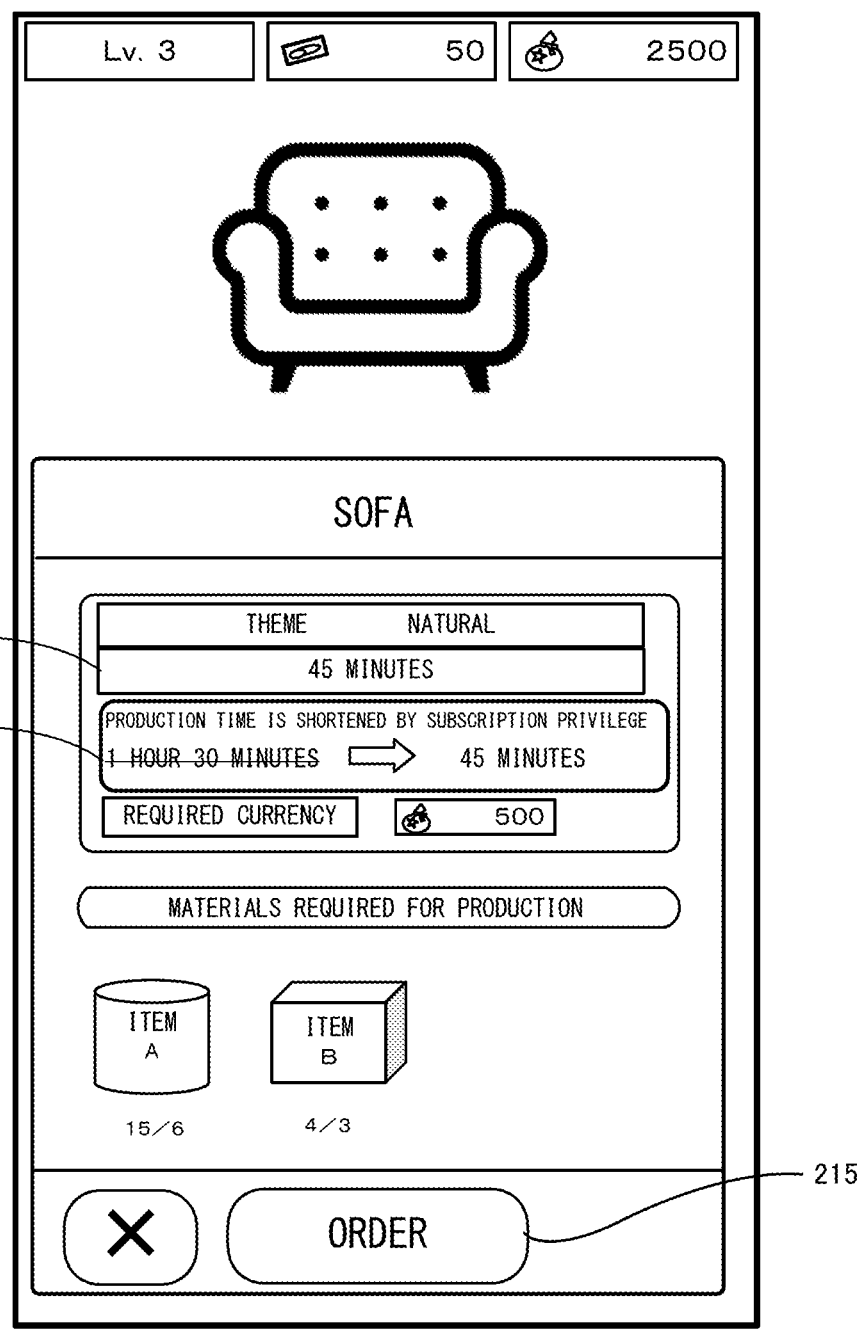
FIG. 8 illustrates a non-limiting screen example of the game in the subscription mode of the exemplary embodiment.

FIG. 8 illustrates an example of the order detail screen in a state where a subscription has been taken out to the subscription service. This screen also basically has the same layout as the above-described order detail screen of FIG. 5, but is different in the following points from the order detail screen of FIG. 5. First, unlike FIG. 5, a post-shortening production time (that is, a waiting time after shortening) is shown at the production time information 213. Furthermore, shortening content information 216 is displayed instead of the subscription invitation banner 214, which is displayed in a state where a subscription has not been taken out to the subscription service. The shortening content information 216 explicitly indicates to the user how much the furniture production time has been shortened by subscribing to the subscription service. In FIG. 8, a reference production time is displayed with a strikeout, and a right arrow mark and a post-shortening production time are displayed, side by side, to the right of the reference production time. Accordingly, it is explicitly indicated to the user that the reference production time has been shortened to the post-shortening production time.

Figure 9:
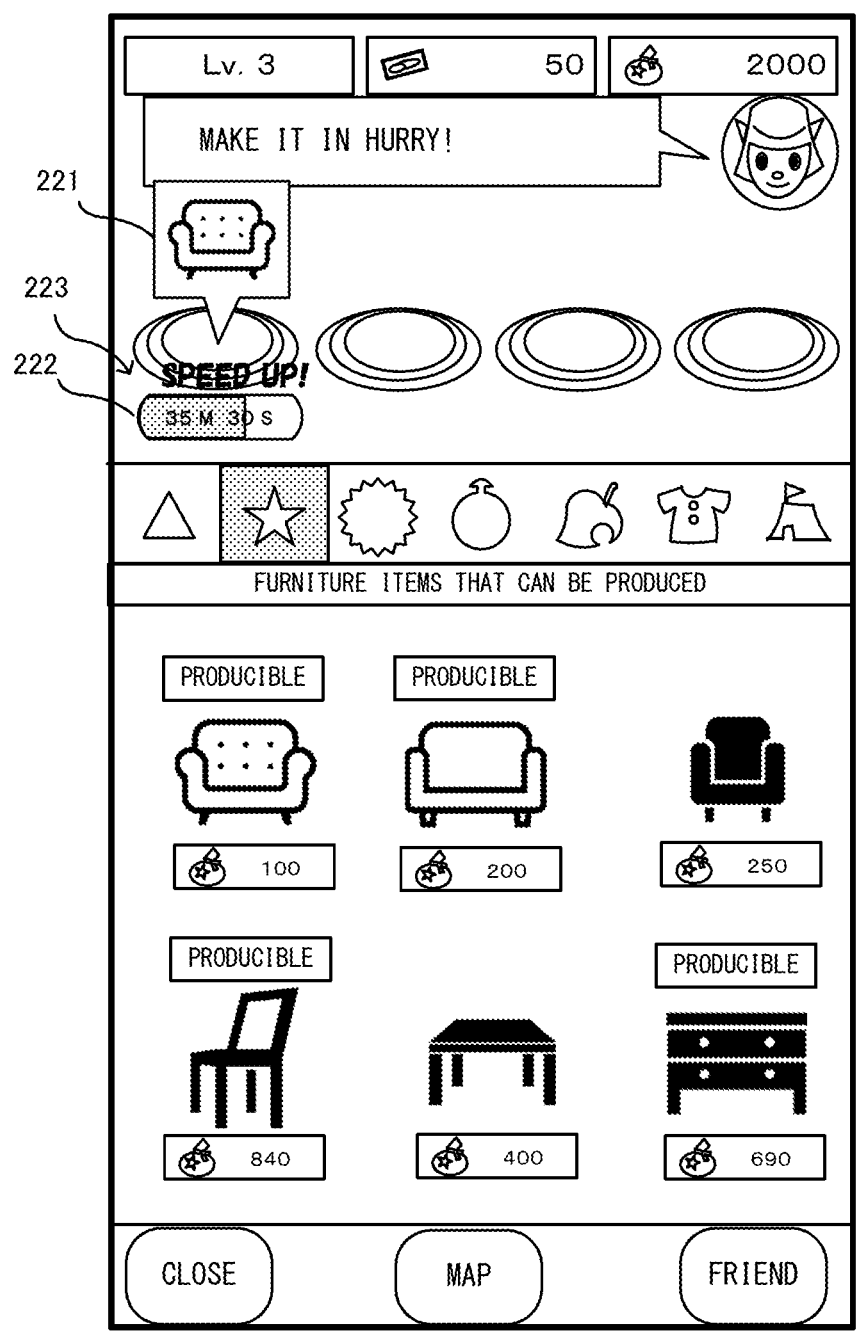
FIG. 9 illustrates a non-limiting screen example of the game in the subscription mode of the exemplary embodiment.

FIG. 9 illustrates an example of a furniture production menu screen after ordering in a state where a subscription has been taken out to the subscription service. In this screen, a currently-produced furniture image 221 and a remaining time meter 222 that are similar to those in FIG. 6 are shown as displays related to the workbench 202 on which a furniture item is being produced. Furthermore, a display 223 indicating that the post-shortening production time is used as the furniture production time is also shown. In FIG. 9, "speed UP!" is displayed to indicate to the user that the furniture item will be completed earlier than the reference production time. Moreover, the remaining time indicated by the remaining time meter 222 is also based on the post-shortening production time.

As described above, in a state where a subscription has not been taken out to the subscription service, the effect of time shortening in the case where the user subscribes to the subscription service is presented to the user, and the advantage of subscribing to the subscription service is clearly presented to the user. In addition, in a state where a subscription has been taken out to the subscription service, it is explicitly indicated to the user that the content/effect of the privilege obtained by the subscription has been applied. Accordingly, the user is allowed to recognize the specific content of the privilege obtained by subscribing to the subscription service. That is, it is explicitly presented to the user that the convenience regarding furniture production can be improved by subscribing to the subscription service.

[Details of Game Processing According to Exemplary Embodiment]

Next, the game processing according to the exemplary embodiment will be described in more detail with reference to FIG. 10 to FIG. 19.

[Data to be Used]

Figure 10:
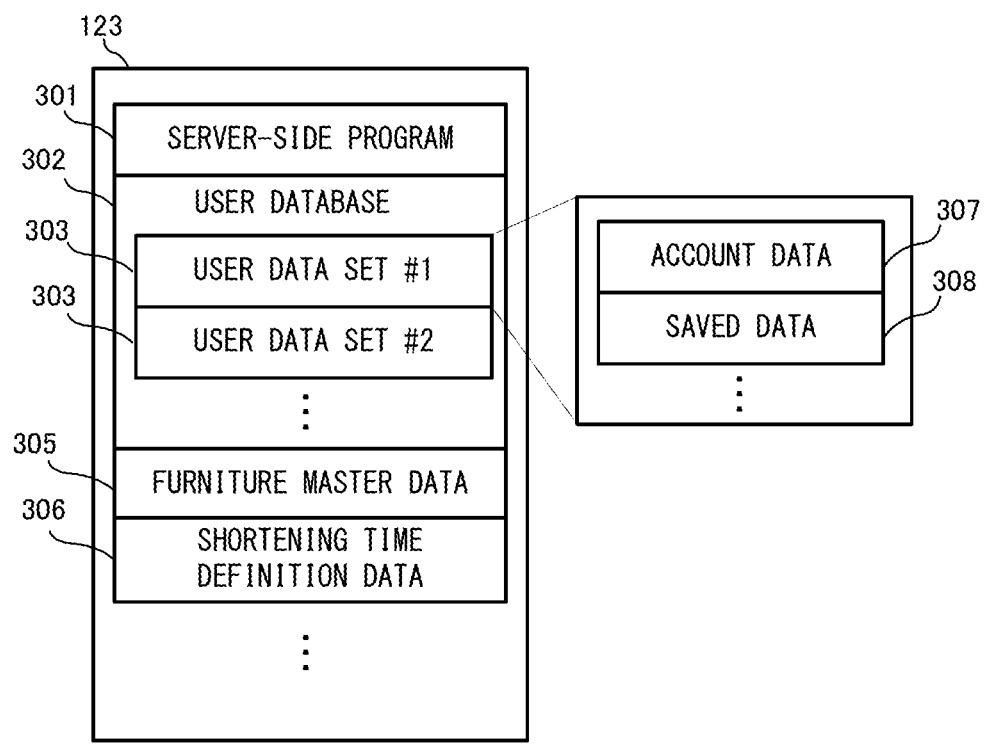
FIG. 10 illustrates a non-limiting example of programs and data stored in a memory 123 of the server 101.

First, various kinds of data to be used in the game processing will be described. FIG. 10 illustrates an example of programs and data stored in the memory 123 of the server 101. In the memory 123, a server-side program 301, a user database 302, furniture master data 305, and shortening time definition data 306 are stored.

The server-side program 301 is a program for causing the server 101 to execute various functions that the server side is responsible for in the game processing according to the exemplary embodiment.

The user database 302 is a database that stores information about each user of the game according to the exemplary embodiment, and includes a plurality of user data sets 303. Each user data set 303 includes account data 307, saved data 308, etc.

The account data 307 is information about an account of each user and is also information for identifying each user. The account data 307 is also used for a process of logging in to the server 101, etc.

Figure 11:
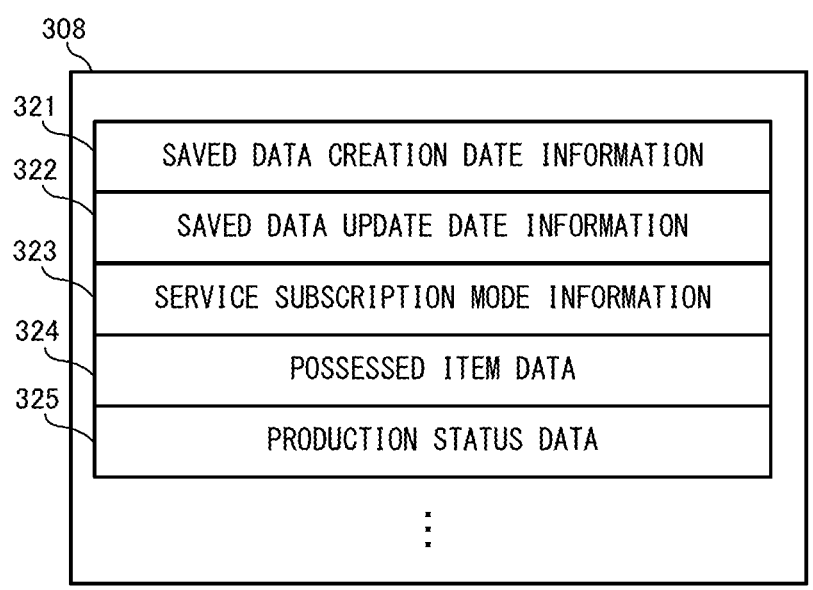
FIG. 11 illustrates a non-limiting example of the data structure of saved data 308.

The saved data 308 is information obtained by saving a play status, a progress status, etc., of the game of each user. FIG. 11 illustrates an example of the structure of the saved data 308. The saved data 308 includes saved data creation date information 321, saved data update date information 322, service subscription mode information 323, possessed item data 324, production status data 325, etc.

The saved data creation date information 321 is information indicating the date and time when the saved data 308 was created.

The saved data update date information 322 is information indicating the date and time when the saved data 308 was updated last. In this example, after the game is started, the saved data 308 is automatically updated at a predetermined timing. Specifically, after the game processing is started, until the game play ends (until the user logs out), for example, at a timing when a scene transition in the game occurs, a timing when an item increase or decrease occurs, etc., information (later-described terminal-side saved data 384) indicating the game state at that time is transmitted from the smart device 102 to the server 101. Then, the saved data 308 is updated with this transmitted content.

The service subscription mode information 323 is information indicating whether a subscription has been taken out to the above subscription service. In other words, the service subscription mode information 323 is also information indicating whether it is in a game state where the furniture production time can be shortened as described above. In the exemplary embodiment, the game state is recognized with two modes, a first mode and a second mode. The first mode indicates, as an example, a state where a subscription has not been taken out to the subscription service, and the second mode indicates, as an example, a state where a subscription has been taken out to this service. Hereinafter, for easy understanding of the description, the first mode is referred to as "non-subscription mode", and the second mode is referred to as "subscription mode". In this example, at the time when a procedure for the user to subscribe to the subscription service is completed, the service subscription mode information 323 is automatically set to the "subscription mode". In addition, at the time when a procedure of unsubscribing (including the case of automatic unsubscribing due to a monthly fee being unpaid) is completed, the service subscription mode information 323 is automatically set to the "non-subscription mode".

The possessed item data 324 is information indicating in-game items (including the above furniture items) possessed by the user. When the user character orders furniture production and receives a completed furniture item, information about the furniture item is added to the possessed item data 324.

The production status data 325 is data for managing a furniture production state. In other words, the production status data 325 is data indicating the state of each of the workbenches 202. FIG. 12 illustrates an example of the data structure of the production status data 325. The production status data 325 is data in a table format including at least a workbench number 331, a work state 332, a production furniture ID 333, production start date and time 334, and a production time 335. One record (data in one row) of the production status data 325 corresponds to one workbench. In this example, since the case where the number of workbenches is four is shown as an example, the number of data sets in the production status data 325 is also four. The workbench number 331 is a number for identifying each workbench 202. The work state 332 is information indicating whether the workbench is currently vacant (hereinafter, in a free state), is in a state where a furniture item is being produced (hereinafter, in the middle of production), or is in a state where the furniture item is completed but is yet to be received (hereinafter, a completed state). The production furniture ID 333 is information for indicating a furniture item that is being produced on the workbench, or a completed furniture item. Information corresponding to a furniture ID of the later-described furniture master data 305 is set. When the work state 332 indicates a free state, this information is empty information. The production start date and time 334 is information indicating the date and time when production of the furniture item was started. The production time 335 is information indicating a furniture production time for a furniture item that is being produced on the workbench. Either the reference production time or the post-shortening production time is set in accordance with whether the game state is the "subscription mode" or the "non-subscription mode". The remaining time until completion can be calculated on the basis of the production time 335 and the production start date and time 334.

Referring back to FIG. 11, in addition to the above, although not shown, various kinds of data required for the game processing, such as image data indicating the appearance of the user character, the name, the current position of the user character in the game world, and friend information, are also stored in the saved data 308.

In this example, the creation date of the saved data is shown as an example of the game start time. In another exemplary embodiment, in the case where a content other than the saved data creation date is used as described above, information indicating the date and time corresponding to the content may be stored as appropriate as information indicating the game start time. For example, in the case where installation date and time is used as the game start time, the date and time when an installation process was completed may be stored. In addition, in the case where a timing when a tutorial process ends is used as the game start time, the date and time when the tutorial process ended may be stored as the game start time.

Referring back to FIG. 10, the furniture master data 305 is information regarding various furniture items that appear in this game. FIG. 13 illustrates an example of the data structure of the furniture master data 305. The furniture master data 305 is data in a table format including at least items such as a furniture ID 341, a reference production time 342, and appearance data 343. The furniture ID 341 is an ID for uniquely identifying/specifying a furniture item. The reference production time 342 is information that defines the reference production time for the furniture item. The appearance data 343 is image data indicating the appearance of the furniture item. In addition, information indicating the genre of the furniture item as described above, information indicating the material items required to produce the furniture item, etc., are also defined.

Referring back to FIG. 10, the shortening time definition data 306 is data that defines how much the furniture production time is shortened from the reference production time in accordance with the game start time as described above. FIG. 14 illustrates an example of the data structure of the shortening time definition data 306. The shortening time definition data 306 is data in a table format including at least number-of-days-elapsed information 351 and shortening time information 352. In this example, the number-of-days-elapsed information 351 is information that defines a number of days elapsed from the saved data creation date. Here, the number-of-days-elapsed information 351 is defined as information on a daily basis. The shortening time information 352 is information that defines a time by which the reference production time is to be shortened (that is to be subtracted from the reference production time). Here, the shortening time information 352 is defined as information on a daily basis. In this example, even when the number of days elapsed is 0 days, a privilege of shortening the production time to some extent can be received by merely subscribing to the subscription service. Therefore, in FIG. 14, a shortening time (here, 120 minutes) that is a predetermined time is defined for the case where the number of days elapsed is 0 days. In this respect, in another exemplary embodiment, a shortening time does not have to be defined for the case where the number of days elapsed is 0 days. In addition, in this example, the case where the number of days elapsed from the game start time is 4460 days is shown as an example of the maximum value. This is one example, and it is needless to say that, in another exemplary embodiment, the maximum value of the number of days elapsed may be another value.

Referring back to FIG. 10, in addition to the above, although not shown, various kinds of data required for the game processing are also stored in the memory 123.

Next, data at the smart device side will be described. FIG. 15 illustrates an example of programs and data stored in the memory 113 of the smart device 102. A client-side program 381, operation data 382, object data 383, terminal-side saved data 384, etc., are stored in the memory 113.

The client-side program 381 is a program for causing the smart device 102 to execute various functions that the smart device side is responsible for in the game processing according to the exemplary embodiment.

The operation data 382 is data indicating the contents of various operations performed on the operation section 115. In the exemplary embodiment, the operation data 382 includes the presence/absence of an input to the touch panel as the operation section 115, data indicating a touch coordinate or the like of the input, data indicating pressed states of various buttons that are not shown, and the like. The contents of the operation data 382 are updated in predetermined cycles on the basis of a signal from the operation section 115.

The object data 383 is data that defines images, shapes, etc., of various objects and stages forming the game world. This data also includes image data indicating the appearance of the above-described virtual characters, etc.

The terminal-side saved data 384 is data that is the saved data 308 acquired from the server 101 and stored at the start of the game processing. Thus, the data structure of the terminal-side saved data 384 is also the same as that of the saved data 308. In addition, as described above, in this example, the saved data 308 is automatically updated at a predetermined timing. To realize this, at a timing when a scene transition in the game occurs, a timing when an item increase or decrease occurs, etc., as described above, the game status based on a processing result of the smart device 102 side is reflected in the terminal-side saved data 384, and the terminal-side saved data 384 is transmitted to the server 101. Then, at the server 101 side, the saved data 308 is updated on the basis of the transmitted data. In the following description, when "update (or creation) of the saved data 308" is described, such a process of update of the terminal-side saved data 384 and such a process of transmission of the terminal-side saved data 384 to the server 101 are also included.

In addition to the above, various kinds of data such as the furniture master data 305 and the shortening time definition data 306 are acquired from the server 101 and stored in the memory 113 as necessary.

[Details of Game Processing Example]

Next, the game processing according to the exemplary embodiment will be described in detail with reference to flowcharts. Here, processing related to a furniture production event will be mainly described, and the description of other game processing is omitted. In addition, the case where the following processing is basically performed by the processor 111 of the smart device 102 will be described as an example. In another exemplary embodiment, a part of the following processing may be executed in the server 101, and the result thereof may be reflected in the processing in the smart device 102. For example, the smart device 102 may mainly perform acquisition of operation data and transmission of the operation data to the server 101, and various image and sound processing. Then, the server 101 may execute game processing based on the operation data, for example, movement of the user object in the virtual game space, various determination processes, or the like, and transmit the execution result to the smart device 102.

Regarding the processing in the server 101, although not shown, a log-in process, a process of transmitting and receiving the saved data 308 and the like, etc., are performed as appropriate in accordance with operations of the user (requests from the smart device 102).

Figure 16:
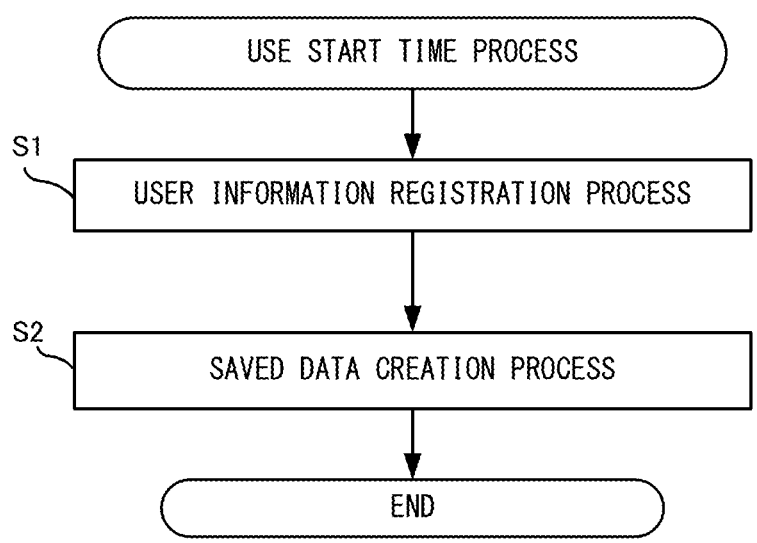
FIG. 16 is a flowchart showing a use start time process in detail.

First, a use start time process that is a process performed when this game is first started in the smart device 102 will be described. This process is, for example, a process executed when this game is first started up and use of the game is started after a process of installing this game into the smart device 102 is completed. FIG. 16 is a flowchart showing the use start time process in detail. In FIG. 16, first, in step S1, the processor 111 executes a user information registration process. This process is a process for causing the user to input a user name, etc., creating account information, etc., and registering the user in the server 101.

Next, in step S2, the processor 111 executes a saved data creation process. That is, a process of setting the date and time at that time as the saved data creation date information 321, creating saved data 308, and storing the saved data 308 in the server 101, is executed.

When the saved data creation process ends, the use start time process ends, and then predetermined game processing is subsequently started.

Next, the processing related to the furniture production event described above using the screen examples will be described in detail. For example, a process in a flowchart shown in FIG. 17 is started in accordance with the user performing a predetermined operation for starting the furniture production event, such as a tap operation on the "furniture production" icon in the menu screen.

Figure 17:
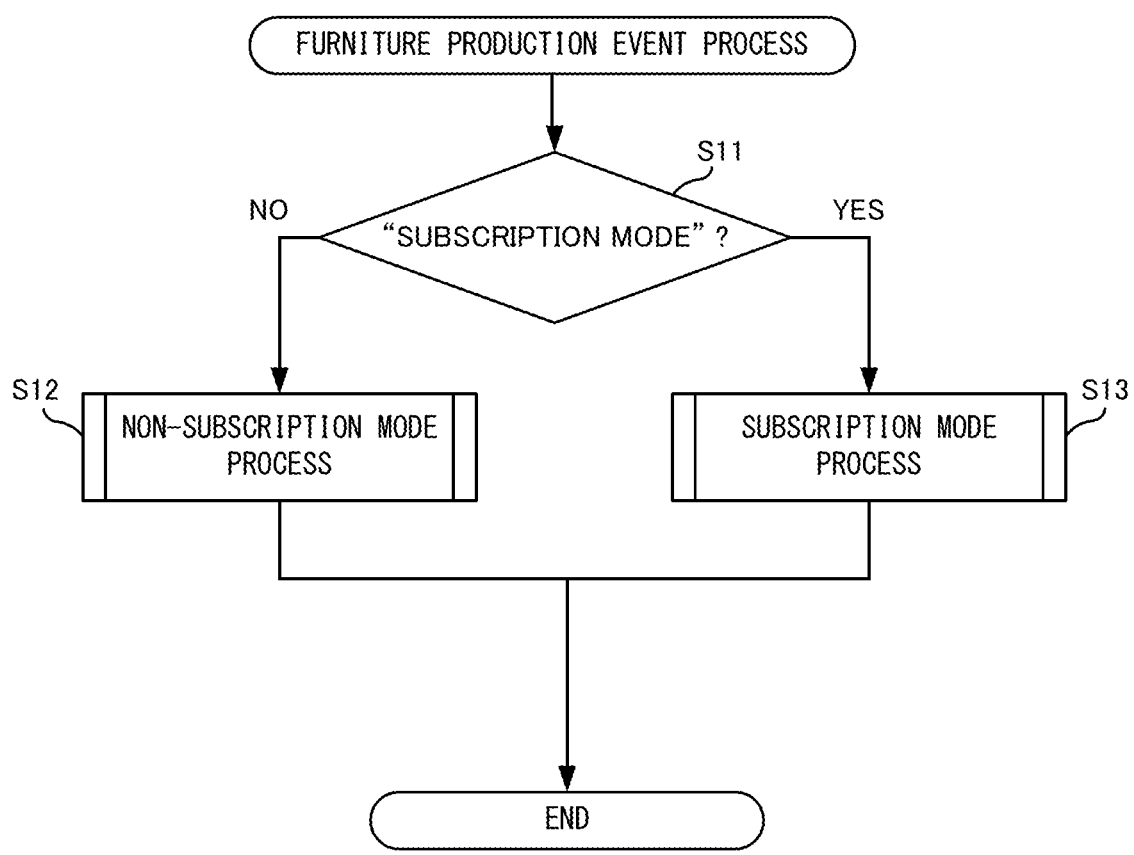
FIG. 17 is a flowchart showing a furniture production event process in detail.

FIG. 17 is a flowchart showing a furniture production event process in detail. In FIG. 17, first, in step S11, the processor 111 refers to the service subscription mode information 323 and determines whether the current game state is the "subscription mode" (or the "non-subscription mode"). As a result of the determination, if the current game state is not the "subscription mode" (NO in step S11), the processor 111 executes a non-subscription mode process in step S12. On the other hand, if the current game state is the "subscription mode" (YES in step S11), the processor 111 executes a subscription mode process in step S13.

Figure 18:
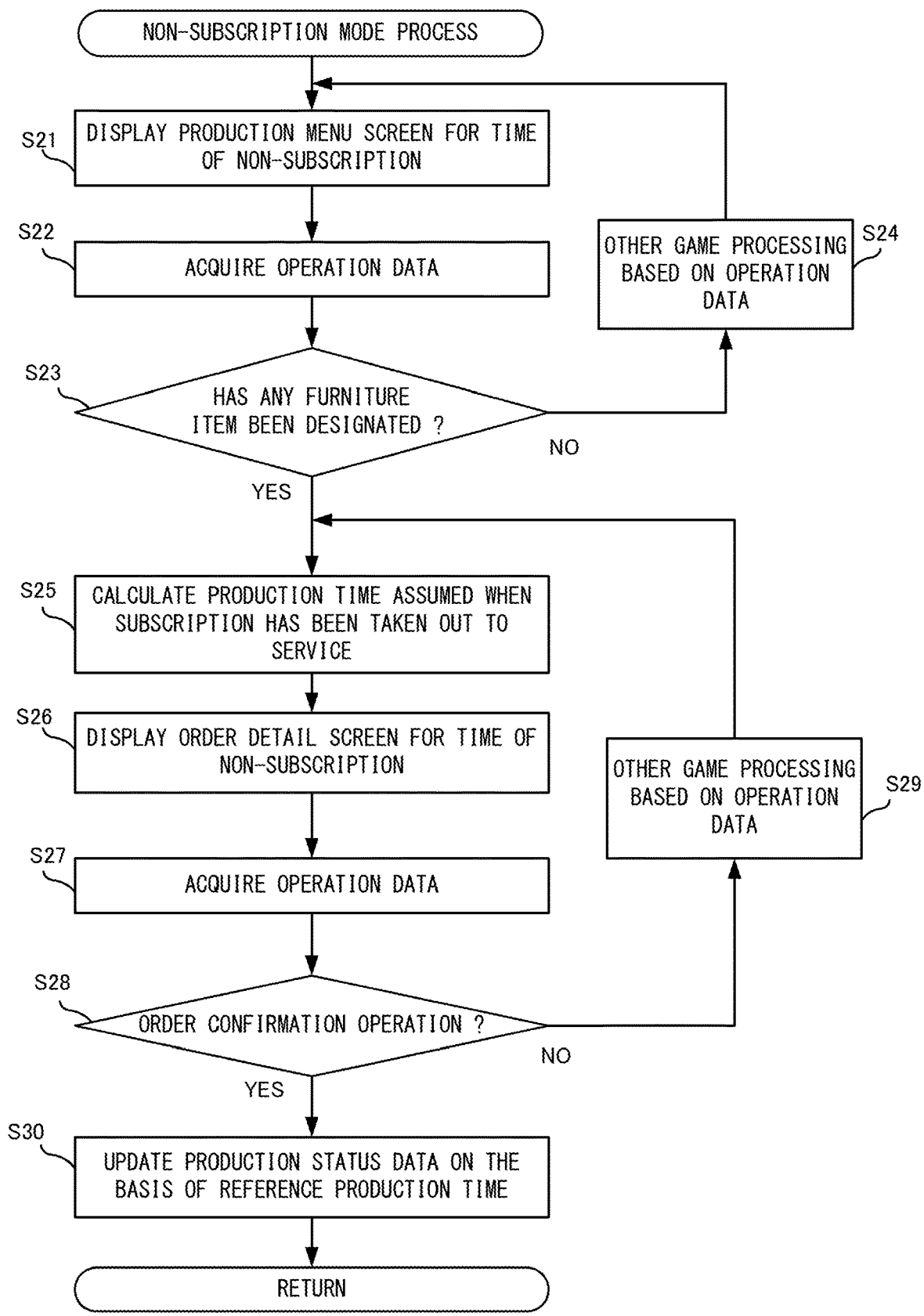
FIG. 18 is a flowchart showing a non-subscription mode process in detail.

FIG. 18 is a flowchart showing the non-subscription mode process in detail. First, in step S21, the processor 111 generates and displays the furniture production menu screen in the non-subscription mode as shown in FIG. 4 described above. Specifically, the processor 111 determines display contents of the workbenches 202 on the basis of the production status data 325. In addition, the processor 111 generates images, etc., of furniture items corresponding to a genre designated in the genre icon group 203, on the basis of the furniture master data 305, and arranges the images, etc., of the furniture items in the furniture selection area 204. Moreover, the processor 111 executes a process required to generate the furniture production menu screen, as appropriate, to generate the furniture production menu screen, and displays the furniture production menu screen on the display section 116. In addition, at this time, if there is a furniture item that is being produced, the processor 111 generates the furniture production menu screen such that the currently-produced furniture image 221 and the remaining time meter 222 are displayed as shown in FIG. 6 described above. After the furniture production menu screen is displayed, the processor 111 waits for an operation from the user.

Next, in step S22, the processor 111 acquires the operation data 382. Subsequently, in step S23, the processor 111 determines whether the operation content indicated by the operation data 382 is an operation for designating any furniture item in the furniture selection area 204. As a result of the determination, if the operation content is not an operation for designating a furniture item (NO in step S23), the processor 111 executes other game processing based on the operation content and returns to step S21. At this time, when an operation for ending the furniture production menu screen such as an operation for returning to the previous screen has been performed, the processor 111 also executes a process of ending the non-subscription mode process, as the other game processing.

On the other hand, as a result of the determination in step S23, if the operation content is an operation for designating a furniture item (YES in step S23), the processor 111 calculates a post-shortening production time assumed if the user has subscribed to the subscription service, in step S25. Specifically, the processor 111 calculates the number of days elapsed from the game start time to the current time, on the basis of the saved data creation date information 321 and the current date. Furthermore, the processor 111 refers to the shortening time definition data 306, specifies the shortening time information 352 corresponding to the number-of-days-elapsed information 351, and determines a shortening time. Then, the processor 111 subtracts the shortening time from the reference production time associated with the designated furniture item, to calculate the post-shortening production time.

Next, in step S26, the processor 111 generates the order detail screen for the case of the non-subscription mode, and displays the order detail screen on the display section 116, as described above with reference to FIG. 5. Specifically, the processor 111 sets the display content of the subscription invitation banner 214 shown in FIG. 5, on the basis of the reference production time for the designated furniture item and the calculated post-shortening production time. In addition, the processor 111 performs setting such that the reference production time is displayed at the production time information 213. Moreover, the processor 111 arranges images of the materials required to produce the furniture item, etc., as appropriate, generates the order detail screen, and displays the order detail screen on the display section 116. Thereafter, the processor 111 waits for an operation from the user.

Next, in step S27, the processor 111 acquires the operation data 382. Subsequently, in step S28, the processor 111 determines whether the operation content indicated by the operation data 382 is an operation for confirming an order (hereinafter, an order confirmation operation). Specifically, the processor 111 determines whether a tap operation has been performed on the "order" button 215 in FIG. 5. As a result of the determination, if the operation content is not an order confirmation operation (NO in step S28), the processor 111 executes other game processing based on the operation content in step S29 and returns to step S25. At this time, when an operation for closing the order detail screen such as an operation for returning to the previous screen has been performed, the processor 111 executes a process of returning to step S21. In addition, when an operation for ending the furniture production menu screen has been performed, the processor 111 executes a process of ending the non-subscription mode process.

On the other hand, as a result of the determination in step S28, if an order confirmation operation has been performed (YES in step S28), next, in step S30, the processor 111 updates the contents of the production status data 325. That is, the processor 111 updates the contents of the production status data 325 such that it is indicated that production of the ordered furniture item is started on a predetermined workbench 202. Here, in this process, since the current game state is the "non-subscription mode", the reference production time is set as the production time 335. Accordingly, production of the designated furniture item is started. This is the end of the non-subscription mode process.

Figure 19:
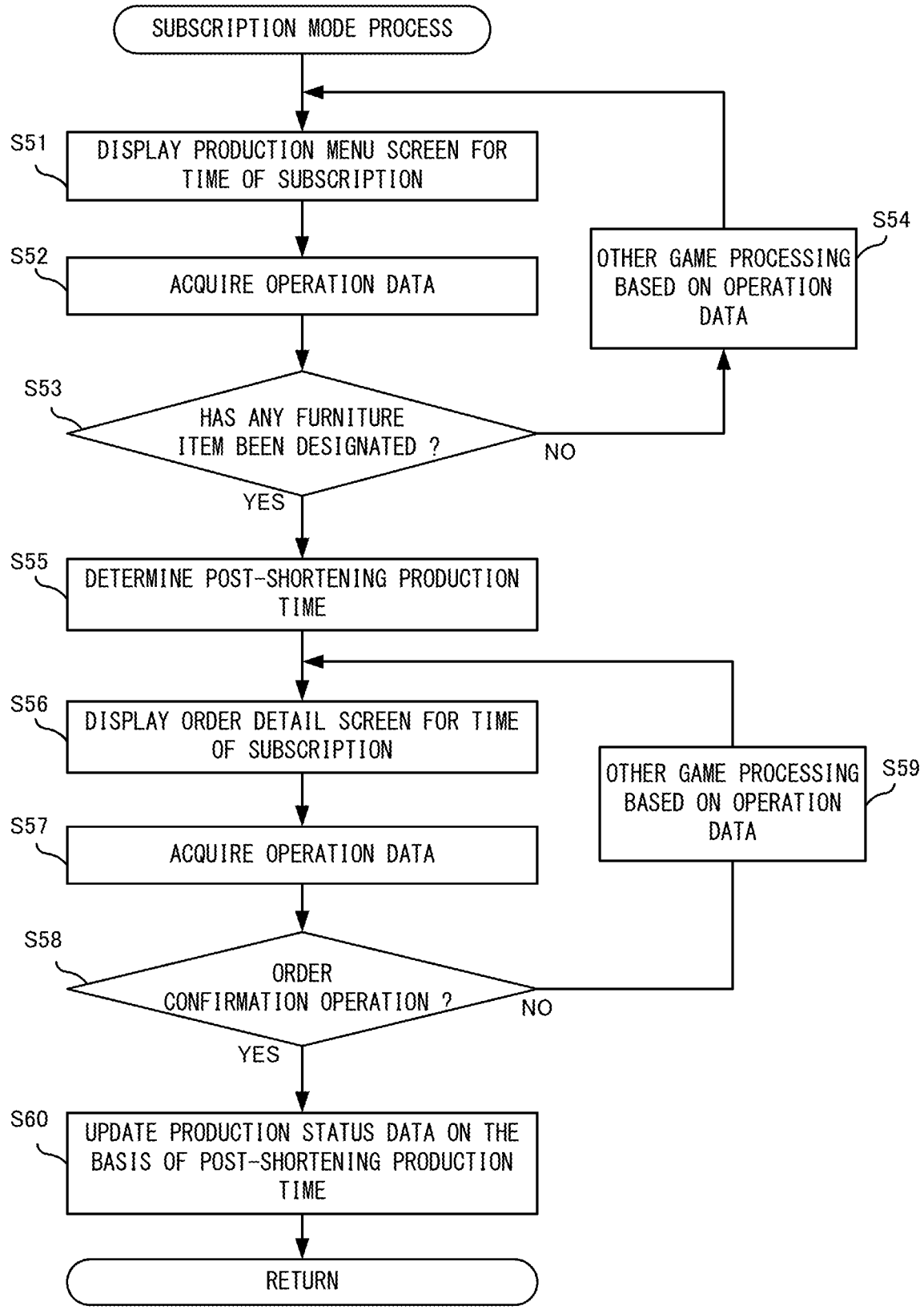
FIG. 19 is a flowchart showing a subscription mode process in detail.

Next, the subscription mode process will be described in detail with reference to FIG. 19. FIG. 19 is a flowchart showing the subscription mode process in detail. Basically, the flow of the subscription mode process is the same as the flow of the non-subscription mode process, but the processing content is different in the following points.

First, the furniture production menu screen for the case of the subscription mode (see FIG. 7) is generated in step S51. At this time, the processor 111 sets display contents such that the privilege content information 206 is displayed in this screen instead of the subscription invitation banner 201. In addition, at this time, if there is a furniture item that is being produced, the processor 111 generates the furniture production menu screen such that "speed UP!" shown in FIG. 9 described above is displayed in addition to the currently-produced furniture image 221 and the remaining time meter 222.

In step S55, the processor 111 determines a post-shortening production time on the basis of the saved data creation date information 321 and the shortening time definition data 306. Then, in step S56, the processor 111 generates the order detail screen for the case of the subscription mode as shown in FIG. 8, on the basis of the post-shortening production time. Specifically, the processor 111 performs setting such that the post-shortening production time is displayed at the production time information 213. Furthermore, the processor 111 sets display contents such that, as the shortening content information 216, it is displayed how much the production time is shortened as compared to the case of the non-subscription mode. Accordingly, the user is allowed to recognize that the production time is shortened as a privilege of subscription to the subscription service, and grasp the effect content thereof (specifically, how much the production time is shortened).

In step S60, the processor 111 updates the production status data 325. At this time, the processor 111 performs update based on the post-shortening production time. That is, the post-shortening production time is set as the production time 335.

Here, a supplemental description will be given for a process performed in the case of NO as a result of the determination in step S58. In this example, after the order detail screen is displayed, even if a state where change of the shortening time can occur due to the passage of time is obtained, the display contents of the order detail screen (the content of the shortening content information 216, etc.) are not updated in real time. This is because, even if such update is not performed, there is no particular disadvantage to the user. However, after the order detail screen is closed once, when the order detail screen is displayed again, the contents to be displayed are updated. In another exemplary embodiment, in such a case, the display contents may be updated in real time.

This is the end of the description of the subscription mode process.

Referring back to FIG. 17, when the non-subscription mode process or the subscription mode process ends, the furniture production event process ends. Although not shown, when the furniture item that is being produced is completed, the processor 111 also executes a process of updating the production status data 325 with a content indicating that the furniture item is completed. Thereafter, the processor 111 also executes a process of adding the completed furniture item to the possessed item data 324, as appropriate, on the basis of an operation of the user at a predetermined timing.

This is the end of the detailed description of the game processing according to the exemplary embodiment.

As described above, in the exemplary embodiment, the furniture production time can be shortened by subscribing to the subscription service. Accordingly, the convenience regarding such a waiting time can be improved. Furthermore, in the exemplary embodiment, determination of a shortening time is based on the game start time. Accordingly, motivation to return to the game can be provided particularly to a user who started use of the game early but then ceased the use of the game.

[Modifications]

Regarding the timing of subscribing to the subscription service, the following process may be performed. First, the case of subscribing to the subscription service after production of a predetermined furniture item is started is assumed. In this case, the reference production time may be used for a furniture item whose production has already been started, and the post-shortening production time may be used for a furniture item that is ordered after the subscription to the service. In addition, the case of unsubscribing from the subscription service after starting production of a furniture item in the subscription mode, a process based on the post-shortening production time may be performed for a furniture item whose production is started before the unsubscription. Moreover, for a furniture item whose production is ordered after the unsubscription, a process may be performed using the reference production time. Furthermore, when furniture production is started in the subscription mode, and a change of the shortening time corresponding to the elapsed time from the game start time occurs before completion, the post-shortening production time at the time when the furniture production is ordered may be used for a furniture item that is being produced. That is, the post-shortening production time at the time when an order is given may be used for the ordered furniture item. Moreover, even when a subscription is taken out again after unsubscription is made once, a post-shortening production time is still determined on the basis of the elapsed time from the game start time.

In the above example, subscribing to a predetermined subscription service has been taken as an example of the condition for shortening the waiting time as described above. The condition is not limited thereto, and may be another condition. For example, satisfying a predetermined condition in the game may be the condition for shortening the waiting time as described above. For example, the above condition may be that the level of the user character exceeds a predetermined value, that the user character acquires a predetermined item, that the play time of the game exceeds a predetermined time, or that a predetermined quest for making it possible to use the function of shortening the waiting time is cleared.

In the above exemplary embodiment, the example in which the production time required when a furniture item is produced is regarded as a waiting time and the waiting time is shortened, has been described. The element to be shortened is not limited thereto, and the following element may be shortened in another exemplary embodiment. For example, in a game of growing plants, vegetables, or the like, or raising livestock (a farm/ranch simulation game, or the like), the growing time/raising time of vegetables or the like corresponds to the waiting time, and this time may be shortened. In addition, for example, in the case of a city-building game, an urban development simulation game, or the like, the construction time required for constructing a building corresponds to the waiting time, and this time may be shortened. Moreover, the above-described processing is applicable to an event in which a predetermined reward (corresponding to the above-described plant or completed building) is obtained and a time required until the reward is obtained is shortened.

Furthermore, the above processing is applicable not only to the above time shortening, but also to an event that is handled as having been achieved by achieving a predetermined amount of tasks. For example, it is assumed that there is a predetermined event in which a reference required amount is defined as an element corresponding to the reference production time. Then, a predetermined value may be subtracted from the reference required amount in accordance with the presence/absence of subscription to the subscription service and the game start time as described above. For example, in an event in which defeating a predetermined number of monsters is required in order to achieve the event (a predetermined amount of tasks of defeating a monster is performed), the required number of defeats may be reduced in accordance with a game start time. That is, in an event in which a reward can be obtained by completing the event, by applying the processing described above, it is possible to perform adjustment such that the condition for obtaining the reward is relaxed in accordance with a game start time.

In the above exemplary embodiment, the example in which the server 101 and the smart device 102 cooperate to perform the game processing has been described. In another exemplary embodiment, the above game processing may be performed only by the smart device 102. That is, various kinds of data stored in the above-described server 101 may be stored in the smart device 102, and the game processing may be performed in a so-called stand-alone format in which the above-described processing is completed only by the smart device 102.

The above processing is also applicable to information processing other than game processing. The above processing is applicable to general processing of executing an event in which a reward is given to the user after elapse of a predetermined reference waiting time that is provided in information processing (other than game processing) executed in another exemplary embodiment.

While the exemplary embodiments have been described in detail, the foregoing description is in all aspects illustrative and not restrictive. It is to be understood that numerous other modifications and variations can be devised without departing from the scope of the exemplary embodiments.

What is claimed is:

1. A game system comprising:
   at least one processor configured to execute computer-executable instructions that cause the at least one processor to perform, singly or in cooperation, operations comprising:
      executing an application program for a video game, the video game including a plurality of gameplay events;
      causing start time information indicating a start time related to when a user first started use of the video game to be stored, such that the start time information is associated with the user;
      processing, as part of the video game, one of the plurality of gameplay events;
      based on starting of the one of the plurality of gameplay events, setting a timer that is timed to expire after a waiting time, the waiting time based on the start time and a reference waiting time that is associated with the one of the plurality of gameplay events, wherein the waiting time is set to decrease in correspondence with an increase in an amount of time between when the start of the one of the plurality of gameplay events occurs and the start time; and
      based on expiration of the timer, giving a reward, which is within the video game and related to the one of the plurality of gameplay events, to the user.

2. The game system according to claim 1, wherein the operations further comprise:
   switching a game mode from a first mode to a second mode based on a condition that the user pays predetermined compensation, and
   in the first mode, the waiting time is set to the reference waiting time,
   in the second mode, the waiting time is set on the basis of the reference waiting time and the start time information.

3. The game system according to claim 2, wherein the waiting time is set by subtracting a shortening value, which is based on the start time information, from the reference waiting time.

4. The game system according to claim 3, wherein the operations further comprise:
   presenting, when the game mode is in the first mode, at least either the shortening time for a case where the at least either the shortening time for a case where the game mode is switched to the second mode or the waiting time shortened by the shortening time, to the user.

5. The game system according to claim 3, wherein, when the game mode is the second mode, the waiting time is set by subtracting the shortening time, which is a value larger than 0, from at least the reference waiting time, regardless of a length of a period from the use start time of the application program for the video game indicated by the start time information to the start of the one of the plurality of gameplay events.

6. The game system according to claim 2, wherein the operations further comprise:
   presenting information about the one of the plurality of game play events to the user, and
   when the game mode is the second mode, presenting information on how much the waiting time is reduced from the reference waiting time.

7. The game system according to claim 6, wherein the operations further comprise, when the game mode is the second mode and the one of the plurality of gameplay events is in progress, an image indicating the waiting time is a time shorter than the reference waiting time is presented.

8. The game system according to claim 2, wherein
   the second mode is a mode to which the game mode is switched on a condition that a right validated by the user paying compensation remains, and
   the waiting time is set on the basis of the reference waiting time and the start time information even when the right becomes validated by the user paying compensation again and the game mode is switched to the second mode after the right is invalidated once.

9. The game system according to claim 1, wherein the start time information includes a timing for when saved data of the application program for the video game video game is created.

10. The game system of claim 1, wherein the start time related to when the user first started use of the video game includes a creation date and/or time for when save data for the video game for the user was created.

11. The game system of claim 1, wherein the start time related to when the user first started use of the video game is based on when an application program for the video game was installed for the user.

12. The game system of claim 1, wherein the start time related to when the user first started use of the video game is based on the date and/or time of when the video game was first started by the user.

13. The game system of claim 1, wherein the start time related to when the user first started use of the video game is based on when a tutorial process for the video game is completed.

14. The game system of claim 1, wherein the start time related to when the user first started use of the video game is based on when the user first registered an account for the video game.

15. A computer-readable non-transitory storage medium having stored therein a game program for causing a computer of a processing system to execute a game application including a predetermined event, the game program causing the computer to perform operation comprising:
executing an application program for a video game, the video game including a plurality of gameplay events;
storing start time information indicating a start time related to when a user first started use of a video game, such that the start time information is associated with the user;
processing, as part of the video game, one of the plurality of gameplay events;
based on starting of the one of the plurality of gameplay events, setting a timer that is timed to expire after a waiting time, the waiting time based on the start time and a reference waiting time that is associated with the one of the plurality of gameplay events, wherein the waiting time is set to decrease in correspondence with an increase in an amount of time between when the start of the one of the plurality of gameplay events occurs and the start time; and
based on expiration of the timer, giving a reward, which is within the video game and related to the one of the plurality of gameplay events, to the user.

16. A game apparatus comprising:
a processing system that includes at least one hardware processor and computer-executable instructions that, when executed by the at least one hardware processor, are configured to cause the at least one hardware processor to perform operations comprising:
executing an application program for a video game, the video game including a plurality of gameplay events;
storing start time information indicating a start time related to when a user first started use of a video game, such that the start time information is associated with the user;
processing, as part of the video game, one of the plurality of gameplay events;
based on starting of the one of the plurality of gameplay events, setting a timer that is timed to expire after a waiting time, the waiting time based on the start time and a reference waiting time that is associated with the one of the plurality of gameplay events, wherein the waiting time is set to decrease in correspondence with an increase in an amount of time between when the start of the one of the plurality of gameplay events occurs and the start time; and
based on expiration of the timer, giving a reward, which is within the video game and related to the one of the plurality of gameplay events, to the user.

17. A game processing control method that is performing on a computer of a processing system, the game processing control method comprising:
executing an application program for a video game, the video game including a plurality of gameplay events;
storing start time information indicating a start time related to when a user first started use of a video game, such that the start time information is associated with the user;
processing, as part of the video game, one of the plurality of gameplay events;
based on starting of the one of the plurality of gameplay events, setting a timer that is timed to expire after a waiting time, the waiting time based on the start time and a reference waiting time that is associated with the one of the plurality of gameplay events, wherein the waiting time is set to decrease in correspondence with an increase in an amount of time between when the start of the one of the plurality of gameplay events occurs and the start time; and
based on expiration of the timer, giving a reward, which is within the video game and related to the one of the plurality of gameplay events, to the user.

18. A game system comprising:
at least one processor configured to execute computer-executable instructions that cause the at least one processor to perform, singly or in cooperation, operations comprising:
executing an application program for a video game, the video game including a plurality of gameplay events;
storing start time information indicating a start time related to when a user first started use of the video game, such that the start time information is associated with the user;
processing, as part of the video game, one of the plurality of gameplay events, wherein the one of the plurality of gameplay events is associated with an achievement condition for an amount of tasks; and
based on starting of the one of the plurality of gameplay events, setting the amount of tasks the basis based on a combination of the start time information and a reference required amount that is defined as a value in connection with the one of the plurality of gameplay events, wherein the amount of tasks is set to decrease in correspondence with an increase in an amount of time between when the start of the one of the plurality of gameplay events occurs and the start time of the start time information.

* * * * *